United States Patent
Wood et al.

(10) Patent No.: US 8,185,517 B1
(45) Date of Patent: May 22, 2012

(54) SYSTEM AND METHOD FOR PROVIDING SUPPORT SERVICES

(75) Inventors: Will K. Wood, Carrollton, TX (US); Mark Allen, Plano, TX (US); David Gaspar, Dallas, TX (US); Patricia Kreditor Gaspar, legal representative, Dallas, TX (US)

(73) Assignee: American Airlines, Inc., Fort Worth, TX (US)

( * ) Notice: Subject to any disclaimer, the term of this patent is extended or adjusted under 35 U.S.C. 154(b) by 205 days.

(21) Appl. No.: 12/426,751

(22) Filed: Apr. 20, 2009

(51) Int. Cl.
*G06F 7/00* (2006.01)

(52) U.S. Cl. ...................................................... 707/713

(58) Field of Classification Search .................. None
See application file for complete search history.

(56) References Cited

U.S. PATENT DOCUMENTS

2002/0107842 A1* 8/2002 Biebesheimer et al. .......... 707/3

* cited by examiner

*Primary Examiner* — Truong Vo
(74) *Attorney, Agent, or Firm* — Haynes and Boone, LLP (57) ABSTRACT

The embodiments of this invention relate to methods and systems for providing support services. An embodiment of this invention may include receiving a query from a user via a first mode of interaction; developing a query context using information related to the query and identity information related to the user; searching first data for first results, wherein the searching is limited by the query context; and providing first results to the user via a second mode of interaction that is different than the first mode of interaction.

20 Claims, 5 Drawing Sheets

```
<head>                                              ⎫
                                                    ⎪
<meta name="description" content="HR Medical Enrollment Employee Form" />   — 404
                                                    ⎪
<meta name="keywords" content="enrollment, medical enrollment, medical" />  — 406
                                                    ⎬ 400
<meta name="vcontext" content="Employee HR Forms" />   — 408
                                                    ⎪
<meta name="vrole" content="all" />   — 410         ⎪
                                                    ⎪
<meta name="vdocscan" content="include=docs/hrpolicy.doc , exclude=*.*" />  — 412
                                                    ⎭
</head>
```
402a → `<head>`
402b → `</head>`

FIG. 4

```
<site>
<url=http://flightline.aa.com username="readonlyuser" password="abcdefg" doclist="index.html" />   — 504
</site>
```
502a → `<site>`
502b → `</site>`

SYSTEM AND METHOD FOR PROVIDING SUPPORT SERVICES

BACKGROUND OF THE DISCLOSURE

Conventional search engines generally use web crawlers and robots to obtain information. After collecting the information, the search engine will generally aggregate the information based on keyword indexing. The mechanisms for aggregating information used by conventional search engines are often based on the wording in the information being aggregated.

Once the information has been indexed, conventional search engines formulate contextual search paradigms based on the indices, and provide users with search results. Upon receiving search engine results, users sift through the results to determine the relevance of the results.

A multi-user environment, such as an enterprise environment, poses several issues with respect to conventional search engines. For example, conventional search engines do not offer the ability to control how information is aggregated and obtained. Additionally, web crawlers and robots merely traverse all the documents on a server without evaluating the context of the information as it is collected.

In a multi-user environment, a user may need to know only certain information that falls within a particular context, and an organization may also limit access to certain information to a subset of users.

SUMMARY OF THE DISCLOSURE

Methods and systems for providing support services are provided. Embodiments of the invention may provide a method for providing assistance, including receiving a query from a user via a first mode of interaction; developing a query context using information related to the query and identity information related to the user; searching first data for first results, wherein the searching is limited by the query context; and providing first results to the user via a second mode of interaction that is different than the first mode of interaction. Embodiments of the invention may further provide a computer program product embodied on a computer-usable medium, the medium having stored thereon a sequence of instructions which, when executed by a processor, causes the processor to execute the foregoing method.

Embodiments of the invention may further a system for providing assistance that includes a message bus and an application server communicably coupled to the message bus. The exemplary system may further include one or more interaction systems communicably coupled to the message bus and configured to receive a query via a first mode of interaction and respond to the query via a second mode of interaction. A support application may also be communicably coupled to the message bus and configured to develop a query context using information related to the query and identity information related to the user. Further, the system may include a crawler system communicably coupled to the message bus and configured to produce indexed resources from a plurality of resources. A search engine may also be communicably coupled to the message bus and configured to search first data for first results, wherein the searching is limited by the query context.

Embodiments of the invention may provide a method for providing assistance, including means for receiving a query from a user via a first mode of interaction; means for developing a query context using information related to the query and identity information related to the user; means for searching first data for first results, wherein the searching is limited by the query context; and means for providing first results to the user via a second mode of interaction that is different than the first mode of interaction.

DETAILED DESCRIPTION

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

The present disclosure relates generally to providing multi-modal support services in an enterprise environment. More specifically, an embodiment of the support system in accordance with the present disclosure facilitates locating information for users of the system. The support system receives inquiries from one or more users and responds to user inquiries using one or more modes of interaction. Modes of interaction may include, without limitation, electronic mail, HTML, Interactive Voice Response (IVR), and person-to-person telephone conversations. One embodiment of the support system uses identity information and user interaction via one or more interactive technologies to establish a query context for determining an answer to user inquiries. A query context may include user identity information, keywords, organizational information, or any other information describing the query.

In describing selected embodiments, various objects or components may be implemented as computing modules. These modules may be general purpose modules, or they may have dedicated functions such as memory management, program flow, instruction processing, and object storage. The modules can be implemented in any way known in the art. For example, in one embodiment a module is implemented in a hardware circuit including custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In an exemplary embodiment, one or more of the modules are implemented in software for execution by various types of processors. An identified module of executable code may, for instance, may include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include of an off-the-shelf or custom program, such as a database management system. These higher-level modules may be decomposable into smaller hardware or software modules corresponding to different parts of a software program and identifiable chips (such as memory chips, ASICs, or a CPU) within a computer.

One type of module is a "network." A network module defines a communications path between endpoints and may include an arbitrary amount of intermediate modules. A network module may encompass various pieces of hardware, such as cables, routers, and modems, as well the software necessary to use that hardware. Another network module may encompass system calls or device-specific mechanisms such as shared memory, pipes, or system messaging services. A third network module may use calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

Figure 1:
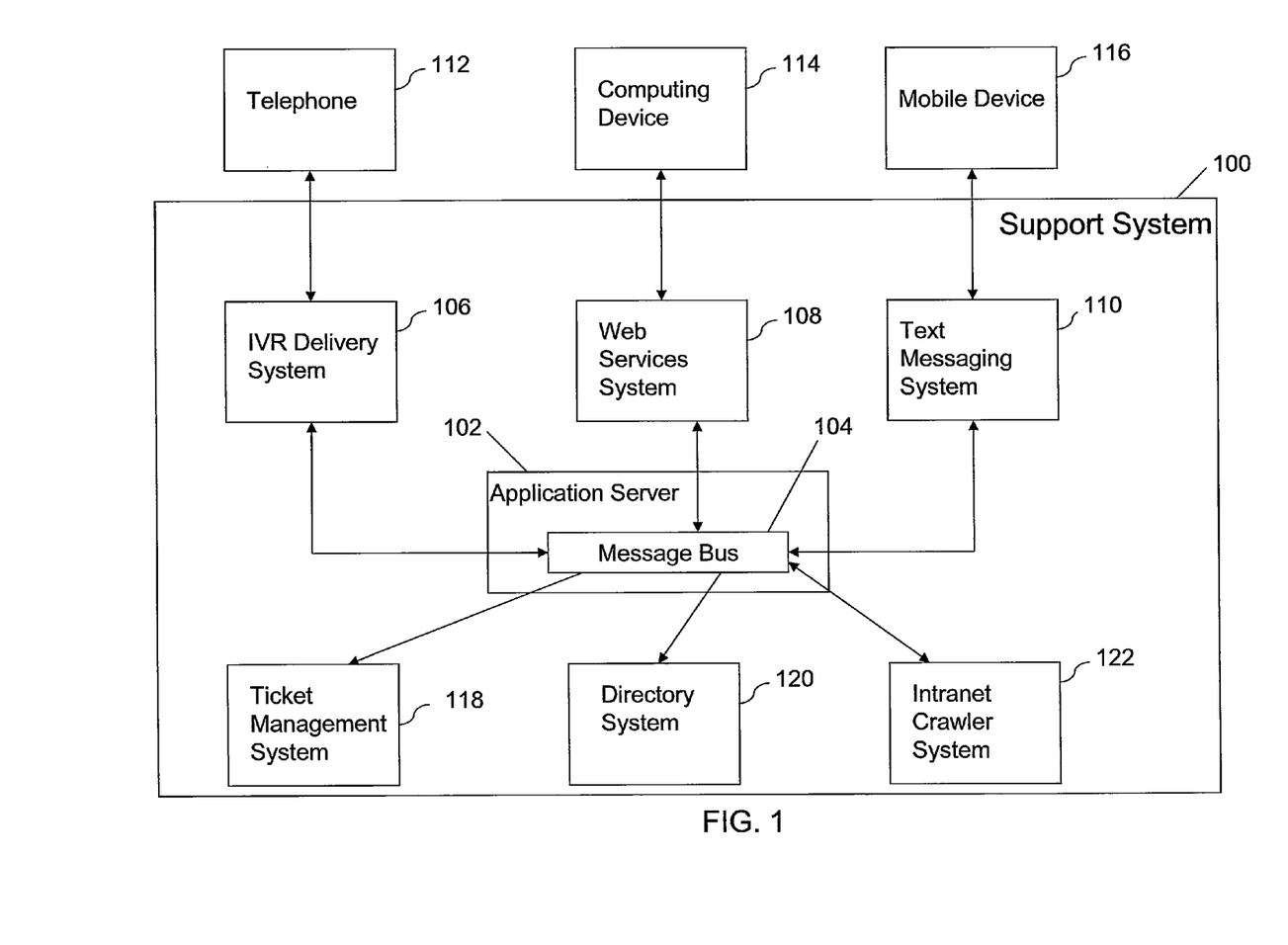
FIG. 1 shows schematically an illustrative embodiment of an enterprise software environment including a support system according to an embodiment of the present disclosure.

Referring to FIG. 1, an enterprise environment is illustrated including an exemplary embodiment of a support system 100. One embodiment of the support system 100 may include an application server 102 having a message bus 104. Support system 100 may further include one or more other interface systems that are communicably coupled to the message bus 104. Interface systems may include one or more sub-interface systems, and may be configured to receive a query via first mode of interaction and respond to the query via a second mode of interaction. Interface systems may include, for example, an Interactive Voice Response ("IVR") system 106, a web services system 108, and a text messaging system 110.

Each interface system may provide a different form of interface for communicating with support system 100. This enables interaction between a user and support system 100 through one or more interfaces. One embodiment of support system 100 enables a user to interface with the IVR delivery system 106 using telecommunications technology, such as a telephone 112. For example, a user may call a phone number that is dedicated to the IVR delivery system 106. In another embodiment, a user may contact IVR delivery system 106 using Voice-Over-Internet-Protocol ("VOIP") technology. Further, in another embodiment, IVR delivery system 106 may also enable outbound call initiation. In one embodiment, IVR delivery system 106 may handle inbound and outbound phone calls using text-to-speech technology. According to one embodiment, the IVR delivery system 106 and the application server 102 communicate via a protocol that facilitates the exchange of voice XML ("VXML") documents.

In another embodiment, a user may interface with the web services system 108 using a computing device 114, such as a personal computer. For example, according to one embodiment, a user may use a computing device 114 that is equipped with a browser to navigate to an HTML-based interface hosted by the web services system 108. The web services system 108 may also provide an application programming interface ("API") to enable communication between web services system 108 and another system. In a first embodiment, the API is a Simple Object Access Protocol ("SOAP") interface. In a second embodiment, the API is a Service Oriented Architecture ("SOA") interface.

In yet another embodiment, a user may contact support system 100 using a mobile device 116 that is capable of sending and receiving messages and data. An example type of message would be Short Message Service ("SMS") text messages. For example, in one embodiment, text messaging system 110 may receive a standard text message from a user, and then relay the text message to the application server 102 via the message bus 104. The text message request may then be handled by support system 100 in a similar manner as any other support request, except that all communication between application server 102, the text messaging system 110, and a user may be in the form of text messages.

A support system 100 may also include one or more auxiliary systems that are communicably coupled to the message bus 104. According to one embodiment, a ticket management system 118, a directory system 120, and a crawler system 122 are communicably coupled to the message bus 104. The ticket management system 118, according to one embodiment, includes an application interface that may be used by various help desk users to coordinate support ticket tracking information. In one embodiment, a ticket management system 118 may be configured to establish a record of user requests submitted via one of the interface systems. One embodiment of a record may include a ticket number, a request number or request ID, and other identifying information that may be helpful in tracking a request. A help desk system or a help desk agent may then later update the record by using the identifying information. For example, a help desk agent might update a record to reflect a closed status once a support request has been fulfilled. In another embodiment, a user may query a ticket management system 118 using identifying information contained in the record.

According to one embodiment, a user might be able to check on the status of a ticket by submitting ticket information to a ticket management system 118 via an interface system. For example, a user may be able to submit identifying information to a ticket management system 118 via a first interface system, and then retrieve ticket status information via a second interface system. The first and second interface systems may be the same, or they may be different. Alternatively, according to another embodiment, a user may submit identifying information to a ticket management system 118 via a first interface system, and the ticket management system 118 may contact a user to deliver ticket status information at a later time via a second interface system. The first and second interface systems may be the same, or they may be different.

According to one embodiment, a directory system 120 may provide directory information related to a user. Directory information may include user authentication and attribute details, such as name, phone number, and location. One embodiment of a directory system 120 may be a Lightweight Directory Access Protocol ("LDAP")-based directory. For example, one embodiment of a directory system 120 may be a MICROSOFT ACTIVE DIRECTORY LDAP directory. A second embodiment may be an implementation of the SUN ONE DIRECTORY SERVER.

According to one embodiment, a crawler system 122 may be configured to produce indexed resources from one or more resources. For example, a crawler system 122 may scan the web pages of an intranet server, and may populate a search engine with data. In one embodiment, a crawler system 122 may scan every page of an intranet. In a second embodiment, a crawler system 122 may scan only specific servers or specific sites of an intranet. A third embodiment of a crawler system 122 may scan all (or substantially all) of the documents and files in a network, such as an intranet, an extranet, the Internet, or any portion thereof, and be capable of identifying certain code contained in the documents and files. For example, in one embodiment, a crawler system 122 scans static HTML and XHTML web pages for meta tags.

According to one embodiment, a crawler system 122 may be capable of parsing one or more document types. For example, one embodiment may be capable of parsing HTML-based web pages, MICROSOFT WORD documents and ADOBE ACROBAT READER documents. In an embodiment of a crawler system 122, upon reading the contents of a document, the crawler system 122 creates a keyword matrix for the document. Information about the document, such as the author, the content, or classification, may be used to develop a document context. In another embodiment, a search engine 202 may index the document based upon the document's context, role and description as determined by web pages that reference the document on a website.

Figure 2:
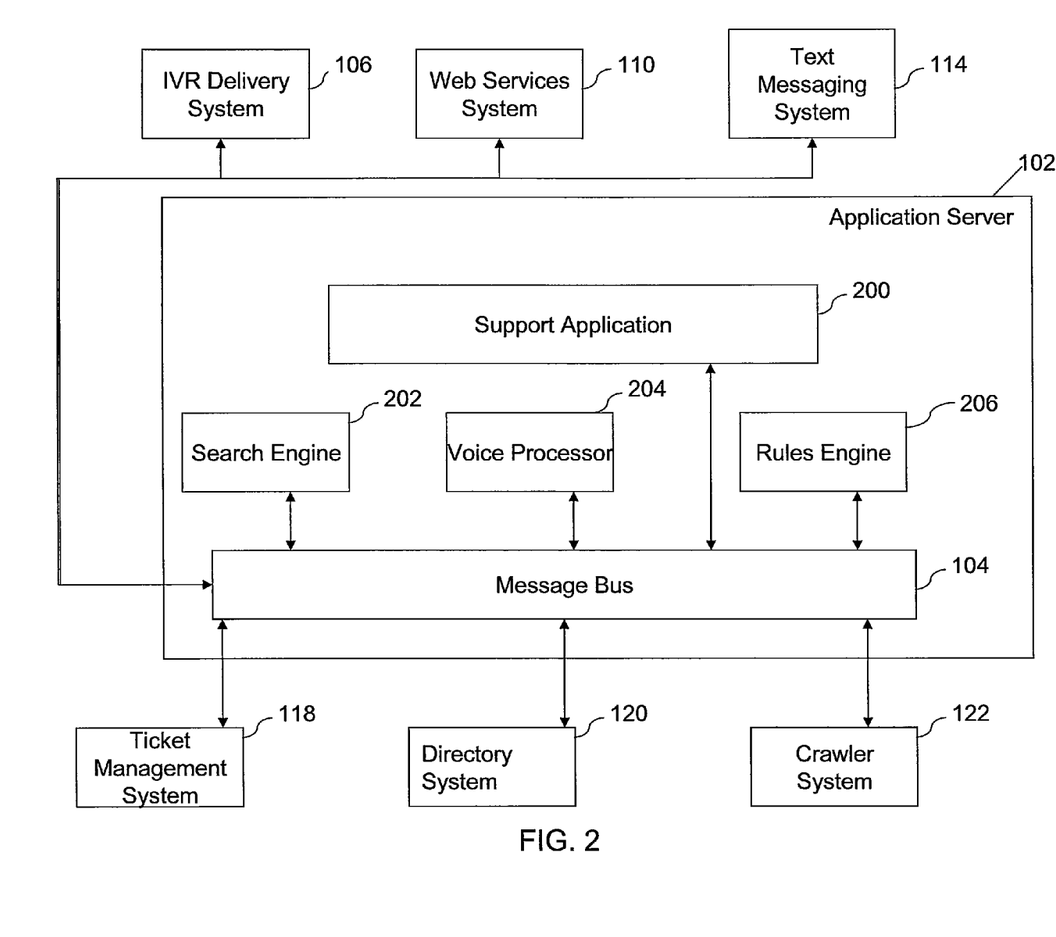
FIG. 2 shows schematically an illustrative embodiment of an application server and auxiliary systems according to an embodiment of the present disclosure.

Referring now to FIG. 2, an embodiment of an application server 102 is shown in more detail. In one embodiment, the application server 102 may be a JAVA-based application server, such as the JAVA 2 PLATFORM ENTERPRISE EDITION ("J2EE"). For example, an embodiment of the application server 102 may be a BEA WEBLOGIC server. The message bus 104, according to one embodiment, may be an implementation of the JAVA message service API, such as OPENJMS. According to one embodiment, the message bus 104 of the application server 102 is also communicably coupled to a search engine 202, a voice processor 204, a rules engine 206, and a support application 200.

According to one embodiment, a voice processor 204 may include an IVR processor. An IVR processor may maintain communications state information for sessions established with the IVR processor. Communication state information may be used to enable dynamic VXML sessions. The IVR processor may also be responsible for dynamically generating the content of VXML and CCXML documents. In one embodiment, the IVR processor interfaces with a search engine 202 when handling queries and interfaces with the rules engine 206 when business logic is needed.

In one embodiment, a rules engine 206 manages business logic conditions. According to one embodiment, depending upon a document or request type, a rules engine 204 may alter the VXML document, delete a request completely, or return a new VXML document that indicates a transformation or rejection of a specific XML document type.

Figure 3:
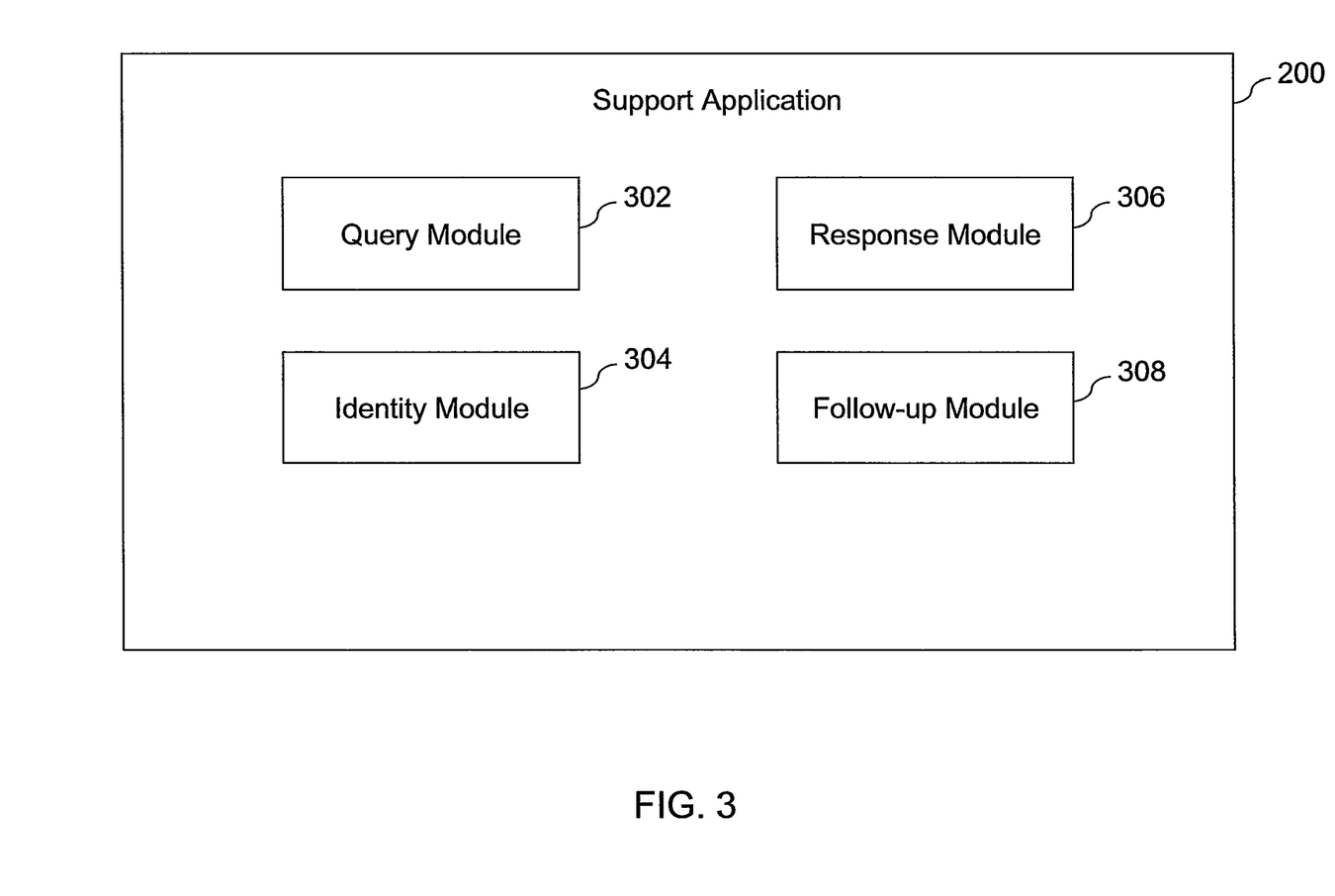
FIG. 3 shows an illustrative embodiment of meta tags according to an embodiment of the present disclosure.

Referring now to FIG. 3, the support application 200 is illustrated in more detail. The support application 200, according to one embodiment, includes the logic that controls the operation of the support system 100. One function of the support application 200 may be to route queries and responses received from one or more users. Another function of the support application 200 may be to process user queries. According to one embodiment, the support application 200 may include one or more modules that are controlled by the support application 200.

In one embodiment, as illustrated in FIG. 3, the support application 208 includes a query module 302, an identity module 304, a response module 306, and a follow-up module 308. One embodiment of the identity module 304 determines the identity of a user based on identity information, such as a user's name, a user's profile, a user's department, a user's position within an organization, a user's physical location, or any other information related to the user's identity. Another embodiment of the identity module 304 retrieves identity information from a directory system 120 via the message bus 104.

According to one embodiment, the query module 302 responds to a user's inquiry, via the IVR delivery system 106, by asking a user to verbally state a request. After the query module 302 receives a user's verbal request, the query module 302 may use voice recognition technology to parse a user's request. According to one exemplary embodiment, parsing the user's request includes identifying keywords in the request. After parsing the user's request, the query module 302 may determine certain information about the query, such as the subject of the query, the priority of the query, keywords in the query, or any other information related to the query. The query module 302 may use such information to develop a query context that may be used to limit the amount of information searched.

In one embodiment, based on a user's request, the support application 208 may generate new VXML documents and send the new VXML documents to the IVR delivery system 106. The IVR delivery system 106 may process each new VXML document, and may request more information from the user based upon the VXML document. For example, in one embodiment, each new VXML document may include additional voice prompts that are to be delivered to the user via the IVR delivery system 106. The additional voice prompts may help the support application 208 further establish a query context for the user's request.

Further, in one embodiment, a query module 302 may attempt to more clearly define the query context by generating Call Control XML ("CCXML") documents, and utilizing the IVR delivery system 106 to initiate outgoing calls to users based upon the contents of the CCXML documents. For example, based upon the contents of the CCXML documents, the IVR delivery system 106 may call the user, and when the user answers the call, the IVR delivery system 106 may deliver a message to the user or ask the user additional questions using text-to-speech technology. The query module 302 may use the answers to the additional questions to refine the query context.

In one embodiment, after the support application 208 determines that it has sufficiently developed the query context, a query module 302 may then seek information from one or more sources, and provide a response to the user's request. In one embodiment, the query module 302 combines the information from the one or more sources with other information, such as feedback about information retrieved from past requests that were similar to the user's request. For example, the feedback may be related to another user's evaluation of the relevance of the information retrieved in response to a past similar request.

A response module 306, according to one embodiment, may then deliver the information to the user. The response module 306 may deliver the information to the user using one or more modes of interaction. In one embodiment, if the user submitted the request via the phone, the response module 306 automatically routes the user to a phone number that may be helpful to the user. In another embodiment, if the user submitted the request via an Internet-based communication medium, a response module 306 automatically routes the user to a web page or other Internet resource that may be helpful to the user.

According to another embodiment, a response module 306 may forward a form to the user. One embodiment of a response module 306 forwards an electronic form to the user's email address. Another embodiment of a response module 306 sends an electronic request for a paper-based form to an administrative clerk. Upon receiving the electronic request, the administrator may send the form to the user. In another embodiment, the support application 208 may deliver web-based content, such as a digital video file, to the user.

Another embodiment of a response module 306 communicates the response to the user using telecommunications technology. In one embodiment, a response module 306 transmits a text message, such as an SMS message, to the user's phone. In a second embodiment, a response module 306 retrieves the user's phone number from a directory system 102, and places a phone call to the user. When the user answers the call, a response module 306 uses text-to-speech technology to provide the user with a "verbal" answer. As evidenced by the above embodiments, there are many ways for a user to interact with the support application 100.

In one embodiment, the follow-up module 308 enables the user to respond to the response received from a response module 306. According to one embodiment, a follow-up module 308 enables a user to speak with an agent if he needs additional information. According to another embodiment, a follow-up module 308 may recommend another webpage where the user may be able to find additional information.

Figure 4:
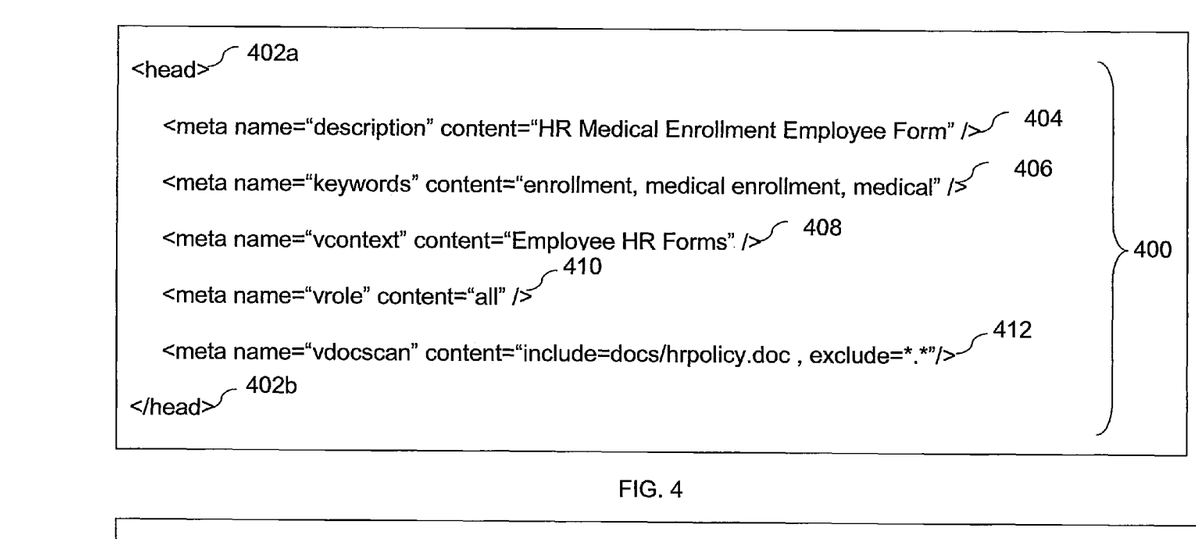
FIG. 4 shows an illustrative embodiment of credentials according to an embodiment of the present disclosure.

Referring now to FIG. 4, a portion of HTML code of a web page is illustrated. The HTML code illustrated in FIG. 4 shows several embodiments of meta tags. One embodiment of a meta tag is a W3C-standard meta tag. A second embodiment of a meta tag is a custom meta tag. A custom meta tag may include a "name" element and a "content" element. An embodiment of the name element may include a name element that begins with the letter "v" and a descriptive name. For example, one embodiment of a custom meta-tag may have a name element of "vcontext." Several embodiments of custom meta tags may be embedded within the "head" HTML tags 402a-b of HTML code of a web page, as illustrated in FIG. 4.

In the exemplary embodiment of HTML code illustrated in FIG. 4, the "description" meta tag 404 describes the content and may be used by a search engine 202 to group information. The "keywords" meta tag 406 may include a list of keywords that a search engine 202 may use to index the content of the web page. The "vcontext" meta tag 408 may logically categorize the content of the web page. In the embodiment of HTML code illustrated in FIG. 4, multiple pieces of content may be grouped in the "Employee HR Forms" category.

Further, in the foregoing exemplary embodiment, the "vrole" meta tag 410 may describe what corporate business role(s) may access the information contained in the web page. For example, one embodiment of a business role may include all business roles. Another embodiment of a business role may include only specific employee levels. Yet another embodiment of a business role may include only specific management levels, or certain executives, such as vice presidents. In one embodiment, the definition of business roles may be specific to a particular organization.

The "vdocscan" meta tag 412 in the foregoing exemplary embodiment of HTML code allows an author of a web page to indicate to a crawler system 122 that certain references should be included or excluded. In one embodiment, if no "vdocscan" meta tag 412 is included in a web page, then that is a signal to a crawler system 122 that it may process every web page it encounters in a directory. However, in the foregoing embodiment, the "vdocscan" meta tag 412 indicates to a crawler system 122 that only one document, hrpolicy.doc, should be processed, and all other documents, indicated in the illustrated embodiment by "*.*", should be excluded from the crawler's activities. One embodiment of a crawler system 122 does an initial scan of all web pages, and looks only for custom meta tags. According to one embodiment, a crawler system 122 performs an initial scan that is limited to identifying "vdocscan" meta tags 412 in the web pages, and then performs a subsequent scan that is limited to the web page files that are identified by any "vdocscan" meta tags 412.

Figure 5:
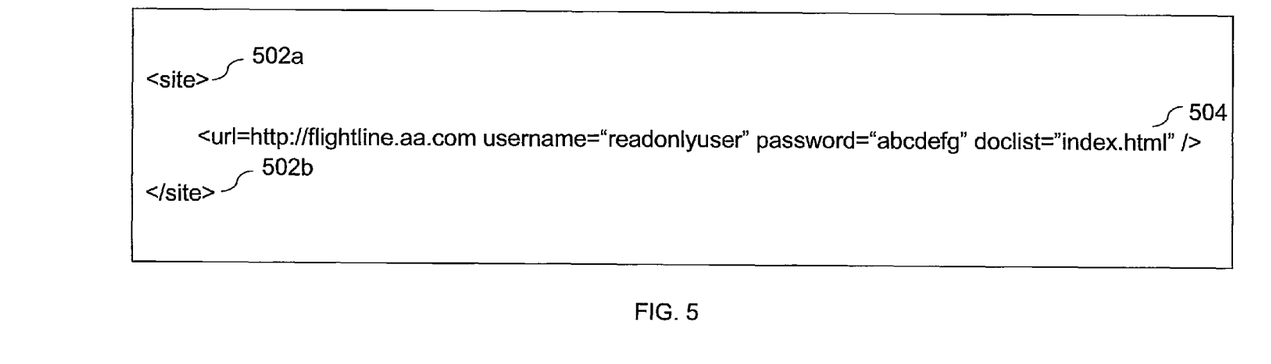
FIG. 5 shows schematically a support application according to an embodiment of the present disclosure.

Referring now to FIG. 5, one exemplary embodiment of a crawler system 122 may include credentials to access certain password-protected sites or web pages. Further, an embodiment of a definition of such credentials may also specify which documents a crawler system 122 may access using the credentials. For example, an embodiment of credentials is illustrated in FIG. 5. In the exemplary embodiment of credentials illustrated in FIG. 5, the credentials tag 504 are included within "site" tags 502a-b. In one embodiment, the username "readonlyuser" and password "abcdefg" may be used by a crawler system 122 to access index.html file at the http://flightline.aa.com url. The doclist element of the "url" tag in the forgoing embodiment may indicate to a crawler system 122 that the files listed in the doclist element may include "vdocscan" meta tags that define any additional files on the website that a crawler system 122 should scan.

Referring to FIGS. 2 and 4, according to one embodiment, a search engine 202 utilizes Single Sign-On ("SSO") credentials. According to one embodiment, the SSO credentials may come from a J2EE Authentication Provider that is communicably coupled to a directory system 102. One embodiment of a search engine 202 establishes a role via an organizational unit that impersonates the role defined in a "vrole" meta tag 410. According to another embodiment of a search engine 202, the search engine 202 may filter search results based upon a role. For example, one embodiment of a search engine 202 does not provide certain search results to a user if the user is not a member of a role designated in a "vrole" meta tag 410. According to one embodiment, a search engine 202 returns a document context, as defined by a "vcontext" meta tag 408, along with any search results. According to one exemplary embodiment, a document context may include document author information, document subject information, document title information, or any other information that may describe a document. A system or a user that receives the search results may use the document context to determine the relevancy of a search result. For example, according to one embodiment, information related to one or more document contexts may be provided to the user, so that the user may choose the most relevant document context. After the user chooses a document context, the search engine 202 provides only certain search results that are included in the selected document context to the user.

Figure 6:
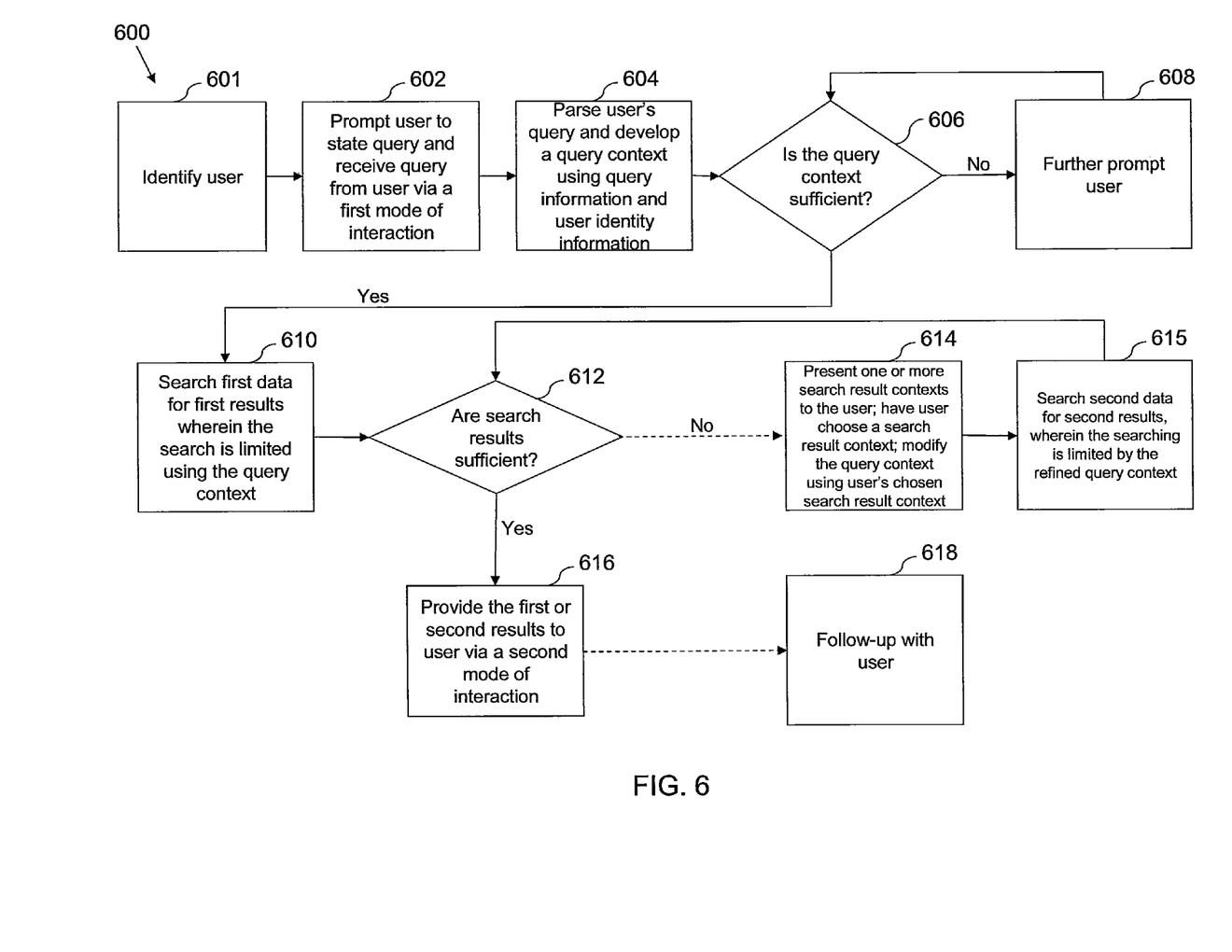
FIG. 6 shows a flow chart of a method for providing support to a user according to an embodiment of the present disclosure.

FIG. 6 shows a flowchart of an exemplary method 600 according to an embodiment of the present disclosure that may be executed by the support application 200. In a step not shown in FIG. 6, a user contacts a support application 200 via a mode of interaction. For example a user may call an IVR system. Alternatively, the support application 200 may initiate contact with the user via a mode of interaction (e.g. the support application 200 may call the user in response to a triggering event). Once a connection has been established with a user, the identity module 304 may identify the user in a step 601. In one exemplary embodiment, the identity module 304 may question the user in order to obtain information in order to identify the user. In a second embodiment, a directory system, such as an LDAP directory may provide identity information to the identity module 304 based on information, such as the user's IP address.

In a step 602, the query module 302 prompts a user to state his query. The user may then respond with a query via a first mode of interaction. For example, a user might state, "I would like a copy of my W-2 tax form." Then, at a step 604, the query module 302 parses the user's query. According to one exemplary embodiment, parsing the user's request in step 604 may include identifying keywords in the request and using the keywords to develop a query context. For example, the key words in the foregoing example may be "copy" and "W-2." The query module 302 may also develop a query context using user identity information. For example, once the user has been identified, the user's department or location may be used to develop the query context. Next, at a step 606 the query module 302 determines whether the user's query establishes an adequate query context. For example, an inadequate query context may cause the search engine 202 to return more than a certain number of search results because the query context is too broad. If the query context is not sufficient, then the method 600 may further prompt the user as shown in a step 608. The user's input may then be used to narrow the query context. In another embodiment, feedback from other users' previous searches may be used to narrow the query context. Steps 606 and 608 may be repeated until the query module 302 determines that the query context is sufficiently narrow.

Once the context is sufficient, the search engine 202 searches first data for first results using the query context. At a step 612, the query module 302 determines whether the search engine 202 results are sufficient. For example, according to one exemplary embodiment, if the search engine 202 returns too many results, then the query module 302 may determine that the search engine 202 results are not sufficient. In another exemplary embodiment, user input may be used to determine whether the search engine 202 results are sufficient.

If the query module 302 determines that the search results are not sufficient, then the query module 302 may proceed to an optional step 614, wherein the query module 302 develops a refined query context. Each search result may have a search result context that describes the search result. A search result context may be developed using a document context. For example, for a search related to tax documents, a document context may be used to develop a search result context based on a tax year. According to one exemplary embodiment, developing a refined query context may include (a) presenting one or more search result contexts to the user, (b) asking the user to choose a search result context, and (c) modifying the query context using the user's chosen search result context.

As an example, the query module 302 may ask the user which tax year a user is interested in. In a step 615, the query module 302 may search second data results for second results, wherein the searching is limited by the refined query context. Continuing with the previous example, the query module 302 may search only documents specified by a user. In another embodiment, feedback from other users' previous searches may be used to develop a refined query context.

Once the query module 302 decides that the search results are sufficient, then the query module 302 may proceed to a step 616, wherein the response module 306 provides the search results to the user. Finally, in an optional step 618, the follow up module 308 may request feedback from the user by following up with the user. Following up with the user may be performed using any mode of interaction. According to one embodiment, the feedback may be used to improve the context sufficiency determination at step 606, or the search engine sufficiency determination at step 612.

An embodiment of a support system 100 that enables multiple modes of interaction, such as the ones described above with respect to FIGS. 1-5, has several benefits. Conventional support systems are media specific. That is, conventional support systems receive queries and respond to queries using the same form of communication. For example, conventional telephone-based support systems limit a user to calling a support phone number, speaking to a representative, and receiving an answer via the telephone. Using a single form of communication limits the user's experience. Further, conventional web-based support solutions require the user to actively search a web site to find answers. Voice recognition and IVR-based support systems are limited by the limitations of a telephone-based support system. For example, such IVR-based support systems cannot provide video or text support materials to the user.

An embodiment of a support system 100, such as the ones described above, are capable of using more than one form of communication to receive and respond to queries. One benefit of using multiple forms of communication is that users of the support system 100 will be able to spend less time looking for information. For example, instead of spending time searching multiple websites for certain information, an embodiment of the present invention allows the user to submit a request via a telecommunications interface, and receive a response via a form of communication of his choice. Further, being able to receive a response via multiple forms of communication allows a user of an embodiment of the support system 100 to see, hear, and read the response, thereby facilitating the user's ability to understand the response. Embodiments of the present invention present users with a straightforward interface that enables users to receive support in their chosen method of communication.

Cost savings is another advantage of the embodiments described herein. An embodiment of the present invention enables enterprises to limit the number of human support representatives. For example, an enterprise may choose to reduce the number of human support representatives who initially receive support phone calls. These support representatives may be replaced with an IVR delivery system 106 or other interface system Further, embodiments of the present invention allow enterprises to fully utilize existing resources such as telephony, desktop and laptop computers, intranets, the Internet, and mobile communication devices. Many enterprises already possess these resources, and embodiments of the present invention allow enterprises to seamlessly integrate each of these various resources into a support process flow.

In view of all of the above and the figures, it should be readily apparent to those skill in the art that the present disclosure introduces a method for providing assistance. An exemplary embodiment of a method for providing assistance in accordance with the present disclosure may include receiving a query from a user via a first mode of interaction; developing a query context using information related to the query and identity information related to the user; searching first data for first results, wherein the searching is limited by the query context; and providing first results to the user via a second mode of interaction that is different than the first mode of interaction.

According to one exemplary embodiment, the method may further include refining the query context. Refining the query context may include presenting one or more search result contexts related to the first results to the user; receiving input from the user regarding a user-chosen search result context; and modifying the query context based on the user-chosen search result context. The exemplary embodiment may also include searching second data for second results, wherein the searching is limited by the refined query context, and providing second results to the user.

In another exemplary embodiment, the second data may be the first results. Further, the second results may be provided to the user via a third mode of interaction. Developing a query context, according to one exemplary embodiment, includes parsing the query for keywords, and identifying the user. The first and second modes of interaction may be one of the following: an Interactive Voice Recognition ("IVR") delivery system configured to receive a voice query, an internet services system configured to receive an Internet query, and a text messaging system configured to receive a text message query.

The present disclosure also provides an exemplary embodiment of a computer program product embodied on a computer-usable medium, the medium having stored thereon a sequence of instructions which, when executed by a processor, causes the processor to execute a method for providing assistance. According to one exemplary embodiment, the method for providing assistance may include the exemplary embodiments of a method for providing assistance described in the foregoing paragraphs.

The present disclosure further provides an exemplary embodiment of a system for providing assistance that includes one or more interaction systems communicably coupled to an application server and configured to receive a query via a first mode of interaction and respond to the query via a second mode of interaction. A support application may also be communicably coupled to the application and configured to develop a query context using information related to the query and identity information related to the user. Further, the system may include a crawler system communicably coupled to the application server and configured to produce indexed resources from a plurality of resources. A search engine may also be communicably coupled to the application server and configured to search first data for first results, wherein the searching is limited by the query context.

According to one exemplary embodiment, the support application may be further configured to refine the query context, wherein refining the query context includes may include presenting one or more search result contexts related to the first results to the user; receiving input from the user regarding a user-chosen search result context; and modifying the query context based on the user-chosen search result context. Further, the support application may also be configured to search second data for second results, wherein the searching is limited by the refined query context, and provide second results to the user.

In the foregoing exemplary embodiment, the second data may be the first results. Also, the second results may be provided to the user via a third mode of interaction. The exemplary embodiment of a system for providing assistance may also include a directory system that is communicably coupled to the application server and configured to provide directory information to the support application.

The present disclosure also provides for an exemplary embodiment of a system for providing assistance, which may include means for receiving a query from a user via a first mode of interaction; means for developing a query context using information related to the query and identity information related to the user; means for searching first data for first results, wherein the searching is limited by the query context; and means for providing first results to the user via a second mode of interaction that is different than the first mode of interaction.

The exemplary embodiment of a system may also include means for refining the query context, wherein refining the query context may include means for presenting one or more search result contexts related to the first results to the user, means for receiving input from the user regarding a user-chosen search result context, and means for modifying the query context based on the user-chosen search result context. In addition, the exemplary embodiment may also include means for searching second data for second results, wherein the searching is limited by the refined query context, and means for providing second results to the user.

According to one exemplary embodiment of the foregoing system, the second data may be the first results. Also, the second results may be provided to the user via a third mode of interaction. In an exemplary embodiment of the foregoing system, the means for developing a query context may include means for parsing the query for keywords, and means for identifying the user. The first and second modes of interaction may be one of an Interactive Voice Recognition ("IVR") delivery system configured to receive a voice query, an internet services system configured to receive an Internet query, and a text messaging system configured to receive a text message query.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Moreover, while different steps, processes, and procedures are described as appearing as distinct acts, it is understood that the steps, process, and procedures could also be performed in different orders, simultaneously, or sequentially. Additionally, the steps, processes, and procedures could be merged into one or more steps, processes, or procedures.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The manner of usage and operation of the present disclosure should be apparent to one of ordinary skill having the benefit of the present disclosure. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The systems and methods disclosed and claimed herein can be made and executed without undue experimentation in light of the present disclosure. While the systems and methods of this invention have been described in terms of embodiments, it will be apparent to those of skill in the art that variations may be applied to the systems and in the steps or in the sequence of steps of the methods described herein without departing from the concept, spirit and scope of the invention. Further, since numerous modifications and changes will readily occur to those skilled in the art, it is not desired to limit the invention to the exact construction and operation shown and described, and accordingly, all such similar substitutes and modifications apparent to those skilled in the art are deemed to be within the scope and concept of the invention.

Although the present disclosure has described embodiments relating to specific networked enterprise environments, it is understood that the apparatus, systems and methods described herein could applied to other environments.

The manner of usage and operation of the present disclosure should be apparent to one of ordinary skill having the benefit of the present disclosure. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The systems and methods disclosed and claimed herein can be made and executed without undue experimentation in light of the present disclosure. While the systems and methods of this invention have been described in terms of embodiments, it will be apparent to those of skill in the art that variations may be applied to the systems and in the steps or in the sequence of steps of the methods described herein without departing from the concept, spirit and scope of the invention. Further, since numerous modifications and changes will readily occur to those skilled in the art, it is not desired to limit the invention to the exact construction and operation shown and described, and accordingly, all such similar substitutes and modifications apparent to those skilled in the art are deemed to be within the scope and concept of the invention.

Although the present disclosure has described embodiments relating to specific networked enterprise environments, it is understood that the apparatus, systems and methods described herein could applied to other environments.

Any spatial references used herein, such as, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above. Additionally, in several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

What is claimed is:

1. A method for providing assistance, comprising:
   receiving a query from a user via a first mode of interaction;
   developing a query context using information related to the query and identity information related to the user;
   searching first data for first results, wherein the searching is limited by the query context; and
   providing first results to the user via a second mode of interaction that is different than the first mode of interaction;
   wherein the identity information related to the user is obtained using the first mode of interaction via which the query is received;

wherein the first mode of interaction is one of an Interactive Voice Recognition ("IVR") delivery system configured to receive a voice inquiry, an internet services system configured to receive an Internet query, and a text messaging system configured to receive a text message query; and wherein the second mode of interaction is another of the IVR delivery system, the internet services system, and the text messaging system, so that:

if the first mode of interaction is the IVR system and thus the identity information related to the user is obtained using the IVR system and the query is received via the IVR system, then the second mode of interaction is either the internet services system or the text messaging system and thus the first results are provided to the user via either the internet services system or the text messaging system;

if the first mode of interaction is the internet services system and thus the identity information related to the user is obtained using the internet services system and the query is received via the internet services system, then the second mode of interaction is either the text messaging system or the IVR system and thus the first results are provided to the user via either the text messaging system or the IVR system; and if the first mode of interaction is the text messaging system and thus the identity information related to the user is obtained using the text messaging system and the query is received via the text messaging system, then the second mode of interaction is either the IVR system or the internet services system and thus the first results are provided to the user via either the IVR system or the internet services system.

2. The method of claim 1, further comprising:

refining the query context, wherein refining the query context includes:

presenting one or more search result contexts related to the first results to the user;

receiving input from the user regarding a user-chosen search result context; and modifying the query context based on the user-chosen search result context;

searching second data for second results, wherein the searching is limited by the refined query context; and providing second results to the user.

3. The method of claim 2 wherein the second data is the first results.

4. The method of claim 2 wherein the second results are provided to the user via a third mode of interaction.

5. The method of claim 1 wherein developing a query context comprises:

parsing the query for keywords; and identifying the user.

6. A computer program product embodied on a computer-usable medium, the medium having stored thereon a sequence of instructions which, when executed by a processor, causes the processor to execute a method, the method comprising:

receiving a query from a user via a first mode of interaction;

developing a query context using information related to the query and identity information related to the user;

searching first data for first results, wherein the searching is limited by the query context; and providing first results to the user via a second mode of interaction that is different than the first mode of interaction;

wherein the identity information related to the user is obtained using the first mode of interaction via which the query is received;

wherein the first mode of interaction is one of an Interactive Voice Recognition ("IVR") delivery system configured to receive a voice inquiry, an internet services system configured to receive an Internet query, and a text messaging system configured to receive a text message query; and wherein the second mode of interaction is another of the IVR delivery system, the internet services system, and the text messaging system, so that:

if the first mode of interaction is the IVR system and thus the identity information related to the user is obtained using the IVR system and the query is received via the IVR system, then the second mode of interaction is either the internet services system or the text messaging system and thus the first results are provided to the user via either the internet services system or the text messaging system;

if the first mode of interaction is the internet services system and thus the identity information related to the user is obtained using the internet services system and the query is received via the internet services system, then the second mode of interaction is either the text messaging system or the IVR system and thus the first results are provided to the user via either the text messaging system or the IVR system; and if the first mode of interaction is the text messaging system and thus the identity information related to the user is obtained using the text messaging system and the query is received via the text messaging system, then the second mode of interaction is either the IVR system or the internet services system and thus the first results are provided to the user via either the IVR system or the internet services system.

7. The computer program product of claim 6, further comprising:

refining the query context, wherein refining the query context includes:

presenting one or more search result contexts related to the first results to the user;

receiving input from the user regarding a user-chosen search result context; and modifying the query context based on the user-chosen search result context;

searching second data for second results, wherein the searching is limited by the refined query context; and providing second results to the user.

8. The computer program product of claim 7 wherein the second data is the first results.

9. The computer program product of claim 7 wherein the second results are provided to the user via a third mode of interaction.

10. The computer program product of claim 7 wherein developing a query context comprises:

parsing the query for keywords; and identifying the user.

11. A system for providing assistance, comprising:

an application server;

a first interaction system communicably coupled to the application server and configured to receive a query;

a second interaction system communicably coupled to the application server and configured to respond to the query;

a support application communicably coupled to the application server and configured to develop a query context using information related to the query and identity information related to the user;

a crawler system communicably coupled to the application server and configured to produce indexed resources from a plurality of resources; and a search engine communicably coupled to the application server and configured to search first data for first results, wherein the searching is limited by the query context;

wherein the identity information related to the user is obtained using the first interaction system via which the query is received;

wherein the first interaction system is one of an Interactive Voice Recognition ("IVR") delivery system configured to receive a voice inquiry, an internet services system configured to receive an Internet query, and a text messaging system configured to receive a text message query; and wherein the second interaction system is another of the IVR delivery system, the internet services system, and the text messaging system, so that:

if the first interaction system is the IVR system and thus the identity information related to the user is obtained using the IVR system, then the second interaction system is either the internet services system or the text messaging system and thus the first results are provided to the user via either the internet services system or the text messaging system;

if the first interaction system is the internet services system and thus the identity information related to the user is obtained using the internet services system, then the second interaction system is either the text messaging system or the IVR system and thus the first results are provided to the user via either the text messaging system or the IVR system; and if the first interaction system is the text messaging system and thus the identity information related to the user is obtained using the text messaging system, then the second interaction system is either the IVR system or the internet services system and thus the first results are provided to the user via either the IVR system or the internet services system.

12. The system of claim 11, wherein the support application is further configured to:

refine the query context, wherein refining the query context includes:
presenting one or more search result contexts related to the first results to the user;
receiving input from the user regarding a user-chosen search result context; and
modifying the query context based on the user-chosen search result context;
search second data for second results, wherein the searching is limited by the refined query context; and
provide second results to the user.

13. The system of claim 12 wherein the second data is the first results.

14. The system of claim 12 wherein the second results are provided to the user via a third mode of interaction.

15. The system of claim 11, further comprising a directory system that is communicably coupled to the application server and configured to provide directory information to the support application.

16. A system for providing assistance, comprising:
means for receiving a query from a user via a first mode of interaction;

means for developing a query context using information related to the query and identity information related to the user;

means for searching first data for first results, wherein the searching is limited by the query context; and means for providing first results to the user via a second mode of interaction that is different than the first mode of interaction;

wherein the identity information related to the user is obtained using the first mode of interaction via which the query is received;

wherein the first mode of interaction is one of an Interactive Voice Recognition ("IVR") delivery system configured to receive a voice inquiry, an internet services system configured to receive an Internet query, and a text messaging system configured to receive a text message query; and wherein the second mode of interaction is another of the IVR delivery system, the internet services system, and the text messaging system, so that:

if the first mode of interaction is the IVR system and thus the identity information related to the user is obtained using the IVR system and the query is received via the IVR system, then the second mode of interaction is either the internet services system or the text messaging system and thus the first results are provided to the user via either the internet services system or the text messaging system;

if the first mode of interaction is the internet services system and thus the identity information related to the user is obtained using the internet services system and the query is received via the internet services system, then the second mode of interaction is either the text messaging system or the IVR system and thus the first results are provided to the user via either the text messaging system or the IVR system; and if the first mode of interaction is the text messaging system and thus the identity information related to the user is obtained using the text messaging system and the query is received via the text messaging system, then the second mode of interaction is either the IVR system or the internet services system and thus the first results are provided to the user via either the IVR system or the internet services system.

17. The system of claim 16, further comprising:
means for refining the query context, wherein refining the query context includes:
means for presenting one or more search result contexts related to the first results to the user;
means for receiving input from the user regarding a user-chosen search result context; and
means for modifying the query context based on the user-chosen search result context;
means for searching second data for second results, wherein the searching is limited by the refined query context; and
means for providing second results to the user.

18. The system of claim 17 wherein the second data is the first results.

19. The system of claim 17 wherein the second results are provided to the user via a third mode of interaction.

20. The system of claim 16 wherein the means for developing a query context comprises:
means for parsing the query for keywords; and
means for identifying the user.

* * * * *